United States Patent
Plummer (10) Patent No.: US 7,931,853 B2
(45) Date of Patent: Apr. 26, 2011

(54) SYSTEM, METHOD, AND APPARATUS FOR CONVERSION BONDING OF PRECURSOR SUBCOMPONENTS INTO A UNITARY MONOLITH

(75) Inventor: Ronald E. Plummer, Decatur, TX (US)

(73) Assignee: Poco Graphite, Inc., Decatur, TX (US)

( * ) Notice: Subject to any disclaimer, the term of this patent is extended or adjusted under 35 U.S.C. 154(b) by 149 days.

(21) Appl. No.: 11/937,626

(22) Filed: Nov. 9, 2007

(65) Prior Publication Data
US 2008/0069754 A1 Mar. 20, 2008

Related U.S. Application Data

(62) Division of application No. 11/269,341, filed on Nov. 8, 2005, now abandoned.

(51) Int. Cl.
*B32B 18/00* (2006.01)
(52) U.S. Cl. .......... 264/646; 264/82; 264/682; 423/345; 423/346; 423/448
(58) Field of Classification Search .................. 423/345, 423/346, 448; 264/682, 82, 646; 156/89
See application file for complete search history.

(56) References Cited

U.S. PATENT DOCUMENTS

| | | | |
|---|---|---|---|
| 2,335,896 A | | 12/1943 | Anderson |
| 4,485,961 A | | 12/1984 | Ekbon et al. |
| 4,554,197 A | | 11/1985 | Chyung et al. |
| 4,732,440 A | | 3/1988 | Gadhok |
| 5,110,422 A | | 5/1992 | Alperine et al. |
| 5,389,411 A | * | 2/1995 | Cohen ..................... 428/34.6 |
| 5,505,805 A | * | 4/1996 | Papenburg et al. ........... 156/155 |
| 5,629,790 A | | 5/1997 | Neukermans et al. |
| 5,683,028 A | * | 11/1997 | Goela et al. .................... 228/121 |
| 6,113,982 A | | 9/2000 | Claar et al. |
| 6,206,531 B1 | | 3/2001 | Williams et al. |

(Continued)

FOREIGN PATENT DOCUMENTS

DE 9321392 U1 11/2007
EP 0558991 B1 2/1993

OTHER PUBLICATIONS

Galvanometer Systems, Multi Position Maker (MPM), Galvo Laser Cutting/Marking (GLC), Edgewise Tools, www.edgewisetools.com, Oct. 2002.

(Continued)

*Primary Examiner* — Jerry Lorengo
*Assistant Examiner* — Jared Wood
(74) *Attorney, Agent, or Firm* — Patterson Thuente Christensen Pedersen, P.A.

(57) ABSTRACT

A process for converting precursor objects into a unitary ceramic object produces, for example, a ceramic, optical scan mirror that is formed from at least two pieces. An optical section has at least one optical surface and at least one attachment surface, and a support section has at least one attachment surface and preferably has a mounting area. The optical and support sections are formed as separate pieces from a precursor material, such as graphite, such that a selected support section can receive any of a plurality of optical sections having different sizes, shapes, or orientations. To form the mirror, the attachment surfaces are placed adjacent each other, and then the sections are converted simultaneously to a ceramic material, such as silicon carbide, to form a monolithic scan mirror.

18 Claims, 4 Drawing Sheets

U.S. PATENT DOCUMENTS

| | | |
|---|---|---|
| 6,259,545 B1 | 7/2001 | Whitcomb et al. |
| 6,403,155 B2 * | 6/2002 | Dubots et al. ............ 427/255.12 |
| 2002/0028360 A1 * | 3/2002 | Shaffer et al. ................. 428/699 |
| 2005/0077226 A1 * | 4/2005 | Bishop et al. .............. 210/321.6 |

OTHER PUBLICATIONS

Intech, LP, 30 mm CA CO2 Scan Mirror Pair, 30 mm CA SiC Scan Mirror Pair. (prior to Nov. 2005).

* cited by examiner

SYSTEM, METHOD, AND APPARATUS FOR CONVERSION BONDING OF PRECURSOR SUBCOMPONENTS INTO A UNITARY MONOLITH

This divisional pataent application claims priority to and the benefit of U.S. patent app. Ser. No. 11/269,341, filed Nov. 8, 2005.

BACKGROUND OF THE INVENTION

1. Field of the Invention

The present invention generally relates to converting a precursor into a ceramic and, in particular, to a process for conversion bonding disparate graphite components into a single, unitary silicon carbide monolith ceramic such as a scan mirror formed from more than one piece.

2. Description of the Related Art

Laser scanners use an oscillating or rotating mirror to reflect a beam of laser light onto a target, for example, a barcode, and a photocell receives the reflected light. The scanners may have one mirror that sweeps in only the horizontal or vertical direction, or the scanner may have two mirrors that sweep the beam in both horizontal and vertical directions to create a grid of scan lines. This type of scanner is the one most often used in retail checkout lines, the advantage being that the chances are good that at least one of the scan lines will get a clean read of a barcode. Thus, the operator does not have to aim the scanner or carefully position the barcode.

The scan mirrors are typically formed as a one-piece design by machining or casting a material, silicon carbide (SiC) being a commonly used material. In addition, mirrors may be machined from a precursor, such as graphite, and then converted to a ceramic, such as silicon carbide. Silicon carbide satisfies the requirements for scan mirrors, which include low mass and high strength, allowing the mirrors to be rotated at high speeds. The mirrors are constructed to have an optical section, which has a reflective face, and a support section, which has a mounting bracket for mounting the mirror to the drive apparatus of the scanner.

The current methods of forming scan mirrors have several problems. One problem of the current methods of forming scan mirrors is that the mirrors have a tendency to fail at or near the mounting bracket. The optical and support section are formed as one unit, and this may lead to engineering compromises for the mounting bracket. Also, the method requires a separate mold or machining process for each mirror, based on the size, shape, orientation of the reflective face and on the drive apparatus to which the mirror will be mounted.

Thus, there is a need for an improved scan mirror and method of construction, in which the optical and support sections of the mirrors are formed separately from a precursor material and assembled prior to conversion to a ceramic. There is also a need for a method of constructing scan mirrors, in which a support section adapted to be mounted to a given drive apparatus may be assembled to any of a plurality of optional optical sections that vary in size, shape, or orientation prior to conversion to a ceramic.

SUMMARY OF THE INVENTION

As graphite is converted from graphite crystal structure to a larger crystal silicon carbide structure, grain growth allows bonding of components during conversion as the grains grow across the interface of adjoining parts. This phenomenon offers the capability to build up complex components with closed cavities at an economical cost and high reliability. Such a silicon carbide (SiC) conversion bond is as strong or stronger than a single (monolithic) SiC converted piece.

For example, a monolithic optical scan mirror may be formed from two or more pieces. An optical section has at least one optical surface and at least one attachment surface, and a support section has at least one attachment surface and preferably has a mounting area. The optical and support sections are formed as separate pieces from a precursor material, such as graphite, such that a selected support section can receive any of a plurality of optical sections having different sizes, shapes, or orientations. To form the mirror, the attachment surfaces are placed adjacent each other, and then the sections are converted simultaneously to a ceramic material, such as silicon carbide, to form a monolithic scan mirror.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

When two or more precursor pieces of a first material (e.g., graphite) are in contact with each other while being converted to another material (e.g., a ceramic such as SiC), the pieces bond to each other and become difficult to separate. In this disclosure, this phenomenon is termed "conversion bonding." The joint surfaces become a continuous phase of converted SiC that combines the previously separate parts. For example, surfaces of high purity graphite bond to each other as they convert to SiC at high temperatures in a high purity environment.

Figure 7:
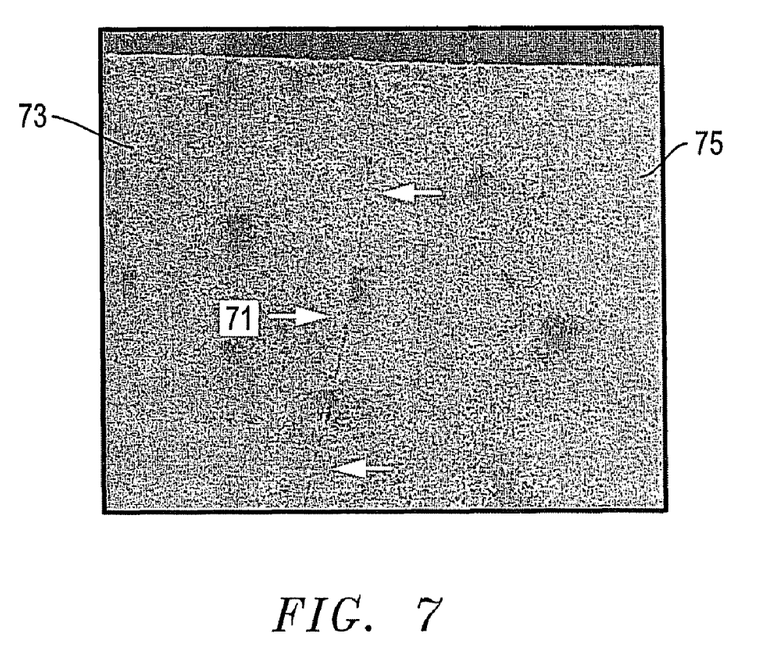
FIG. 7 is a micrograph of a seam between two precursor materials prior to conversion bonding.
Figure 8:
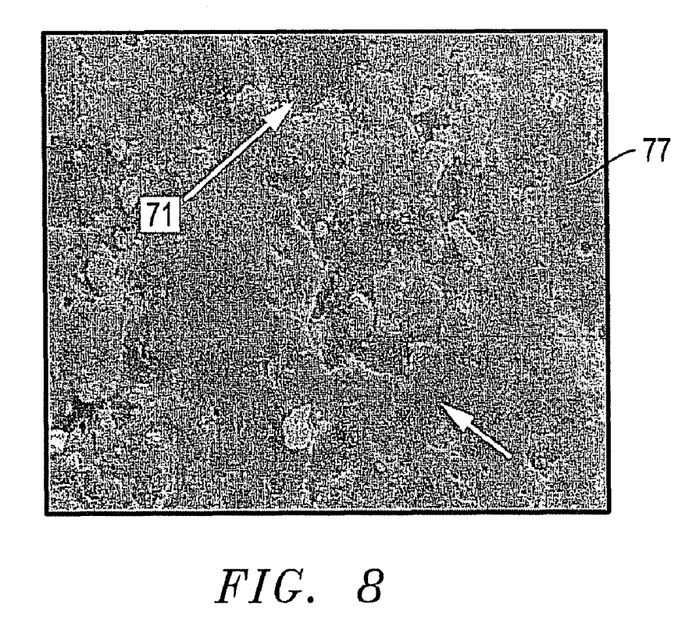
FIG. 8 is a micrograph of a sectioned portion of the two precursor materials of FIG. 7 at the former seam after conversion bonding.

As shown in FIGS. 7 and 8, micrographs from a scanning electron microscope (SEM) provide further qualitative information on the nature of the conversion bond. The micrographs were taken at magnifications ranging from X18-X1000 in order to provide consistent reference points for the images. A chamfered groove 71 provides a reference for the outside of the part(s) in both face and cross-sectional views of the two precursor objects 73, 75 (FIG. 7) and the single combined object 77 (FIG. 8).

When the object 77 is formed, the seam between the previously separate objects 73, 75 is crossed by grain growth structure. There appears to be no observable structural or morphological differences between the mated pieces and the seam. High magnification images show grain structure formation across the area of the seam. The mating pieces are one unitary piece after conversion bonding. The shear strengths for SiC conversion bonded samples having interference fits ranging between 0.001" to 0.005" within a 1.000" diameter area were equal to or greater in strength than identical components that were originally formed as a single unit.

FIGS. 1 through 6 illustrate one embodiment of the present invention, in which an optical mirror is formed by simultaneous conversion of two adjacent sections into a monolithic ceramic structure. The mirrors are typically used as galvanometer mirrors or other types of high-speed scan mirrors.

The invention provides a means to separate the non-optical section, which includes the mounting area, from the optical section, on which is formed the reflective surface. This allows a selected non-optical section to be mated to any of a plurality of optical sections that vary in size, shape, and orientation. For example, a common non-optical section would interface a specific scanner drive and accommodate multiple optical component configurations and variations. The invention allows a separate focus on engineering, design, and manufacturing issues for each of the components.

Figure 1:
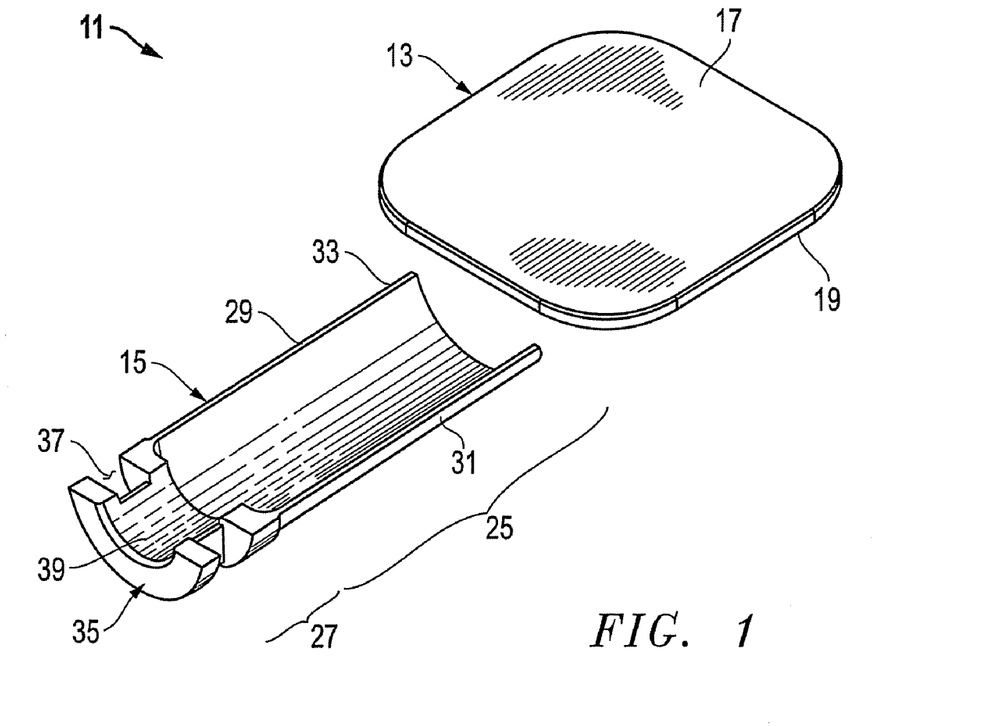
FIG. 1 is an exploded, perspective view of a scan mirror according to the invention, the mirror being shown prior to assembly.
Figure 2:
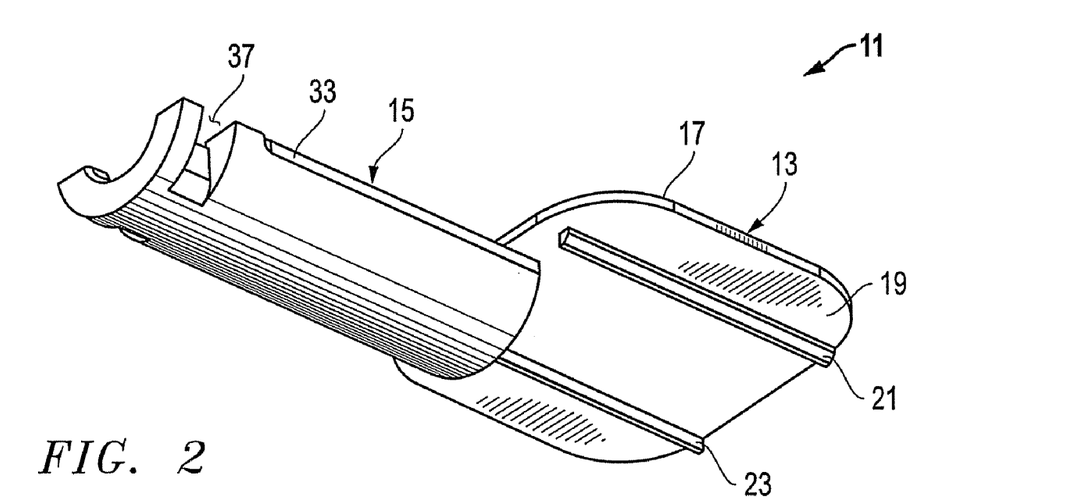
FIG. 2 is an exploded, perspective view of the scan mirror of FIG. 1, the mirror being shown prior to assembly.

FIGS. 1 and 2 are exploded, perspective views of mirror 11, which comprises an optical section 13 and a non-optical support section 15. Sections 13, 15 are formed from a precursor, such as graphite, which can be converted to SiC. Alternatively, sections 13, 15 may be formed of a similar precursor, allowing conversion of sections 13, 15 into a different ceramic material.

Section 13 is formed as a planar component having a smooth optical surface 17 and an opposing attachment surface 19. Though not shown, after conversion to a ceramic, optical surface 17 is coated with fine-grain SiC and polished to form a reflective surface for reflecting laser light directed toward mirror 11. Attachment surface 19 is formed to have rails 21, 23, which are parallel and spaced apart from each other. Rails 21, 23 are parallel to and typically located equidistant from a centerline (not shown) that bisects section 13.

Section 15 may be formed in various shapes, but is shown as having a semi-tubular construction, with an attachment portion 25 and a mounting portion 27. Attachment portion 25 has a semi-circular lateral cross-section and terminates in two attachment surfaces 29, 31, which are positioned adjacent attachment surface 19 of section 13 when mirror 11 is assembled. A relief 33 is formed on each side of attachment portion 25 for receiving one of rails 21, 23. Mounting portion 27 comprises a semi-cylindrical mounting bracket 35 having two slots 37 that align with corresponding features on the scanner drive (not shown) when mirror 11 is installed. Bracket 35 also has a curved inner surface shaped and sized for receiving a portion of a shaft (not shown) of the scanner drive system.

When assembled, the axis of rotation of the shaft of the drive system preferably bisects and is tangent to optical surface 17, providing optical surface 17 with an axis of rotation located on surface 17. This placement maintains a consistent location for mirror 11 and eliminates any additional radial forces on mirror 11 as mirror 11 is rotated.

Figure 3:
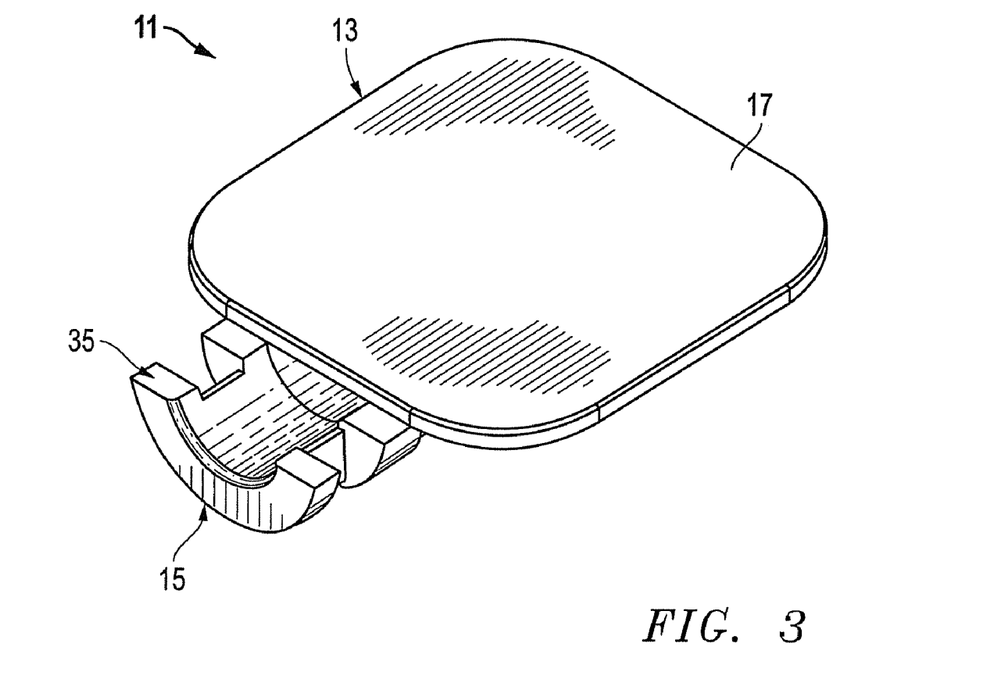
FIG. 3 is a perspective view of the scan mirror of FIG. 1, the mirror being shown after assembly.
Figure 4:
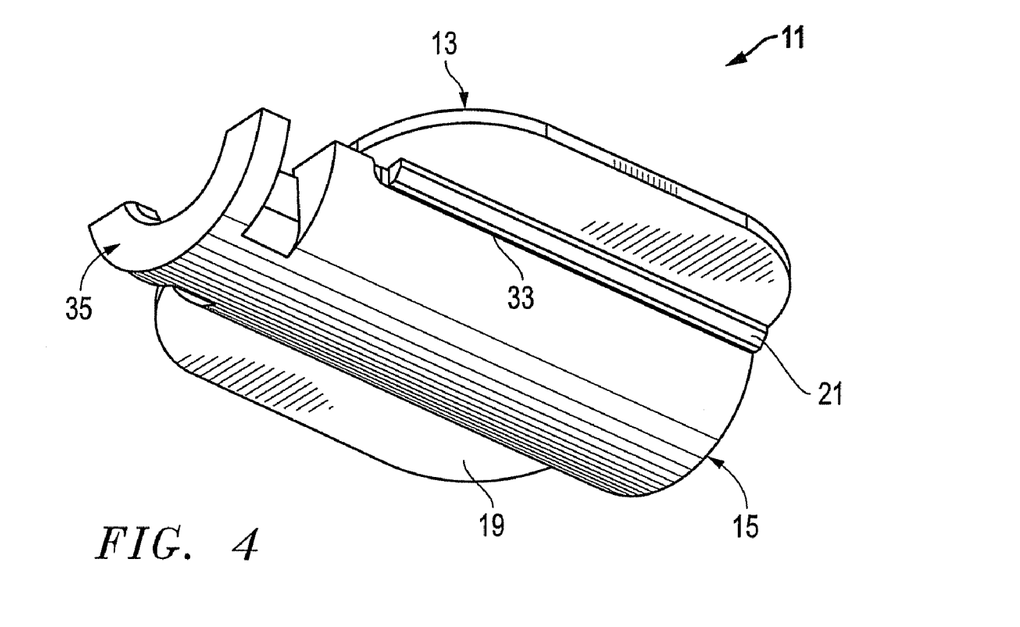
FIG. 4 is a perspective view of the scan mirror of FIG. 1, the mirror being shown after assembly.

FIGS. 3 and 4 show mirror 11 after assembly of sections 13, 15 and before conversion to a ceramic. Attachment surfaces 29, 31 of section 15 are located adjacent attachment surface 19 of section 13, with attachment portion 25 extending across the full length of section 13. Each rail 21, 23 on attachment surface 19 is located within a relief 33 on section 15, aligning section 13 to the desired orientation relative to section 15. Bracket 35 is located near an outer edge of section 13 for placing section 13 in close proximity to the shaft of the drive system. Mirror 13 is now ready for conversion to a ceramic.

When forming mirror 11 from SiC, sections 13, 15 are machined from graphite, assembled, and then converted to SiC. Silicon carbide has the qualities necessary for high-performance optical components, since SiC has an extremely high specific stiffness, high thermal conductivity and high dimensional stability. The resulting mirror 11 has reduced thermal mass while retaining high strength.

Complex shapes are easily machined into the graphite before it is converted into SiC, and the conversion method eliminates the need for expensive tooling and long lead times associated with pressing, casting, shaping and final finishing of SiC items. Conversion occurs when silicon atoms are substituted for approximately half of the carbon atoms in the graphite. During conversion, grain growth of the SiC crystal structure across the interface of attachment surfaces 19, 29, 31 bonds sections 13, 15, forming a one-piece structure.

Referring to FIGS. 1 through 4, to form mirror 11 for a particular end-user application, the requirements for the application are identified first, including the shape, size, and orientation of the required optical surface 17 and the type of drive system of the application. An optical section 13 that corresponds to the requirements is acquired, preferably by selection from an inventory of different sections 13, though section 13 may require machining to the desired characteristics. Then, a support section 15 is acquired, preferably from an inventory of sections 15 adapted for use on specific drive systems. Sections 13, 15 are assembled with attachment surface 29, 31 of section 15 adjacent attachment surface 19 of section 13. Sections 13, 15 are then converted to a ceramic material, sections 13, 15 joining to form mirror 11 as a one-piece structure. Additional machining may be required to give mirror 11 the desired final measurements, and then optical surface 17 is polished to a mirror finish. Mirror 11 can then be installed on the drive system for operation.

Figure 5:
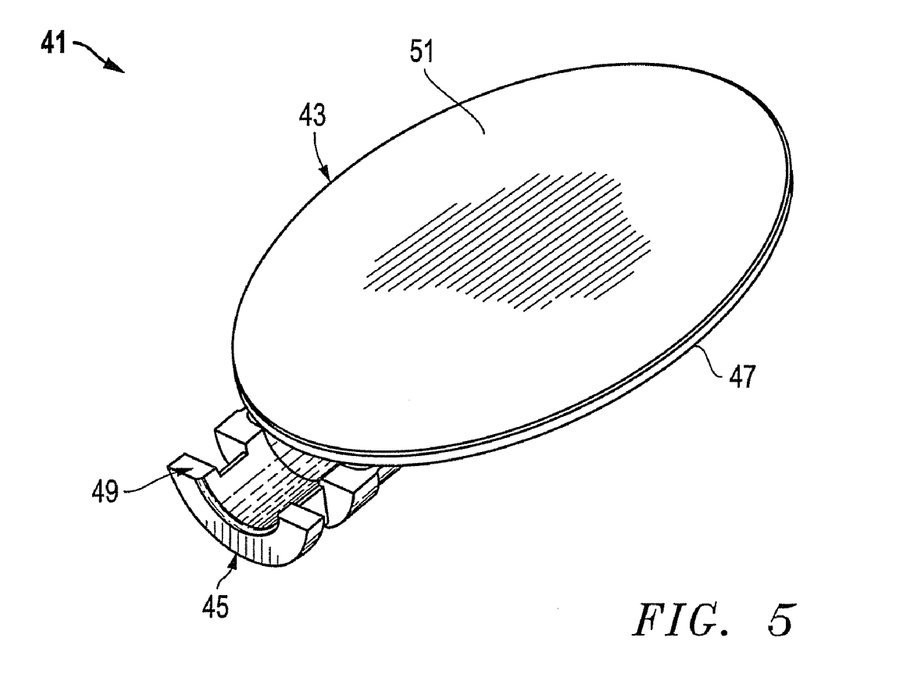
FIG. 5 is a perspective view of an alternative embodiment of the scan mirror of the invention.
Figure 6:
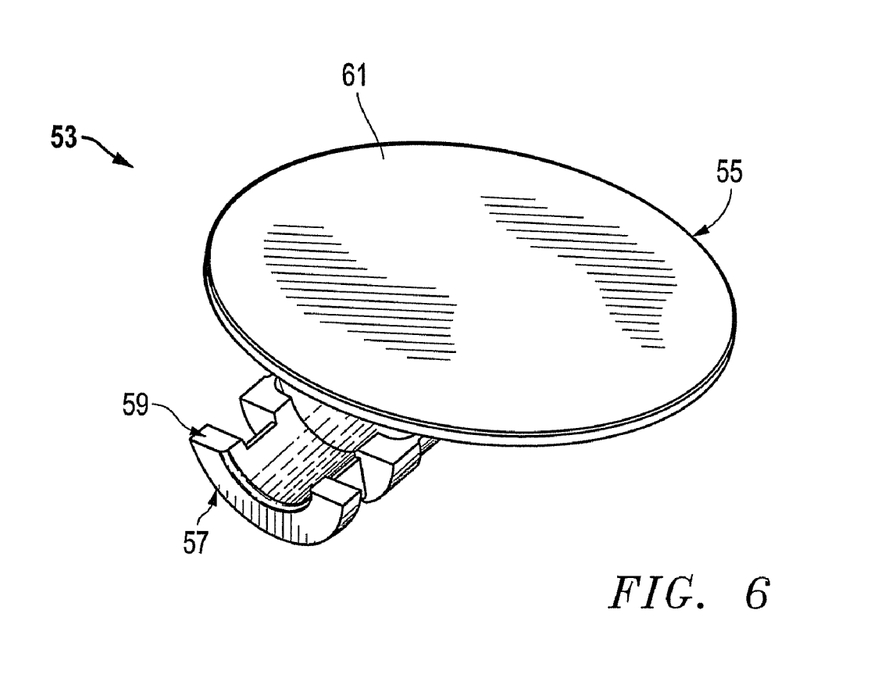
FIG. 6 is a perspective view of an alternative embodiment of the scan mirror of the invention.

FIGS. 5 and 6 show additional embodiments of the invention, wherein optical section of a different shape or orientation are assembled with a support section having a mounting bracket like bracket 35.

Scan mirror 41 in FIG. 5 has optical section 43 having an oval shape, wherein the major axis is parallel to the axis of rotation of the drive shaft (not shown). A support section 45 is located adjacent an attachment surface 47 of section 43, with mounting bracket 49 located near an outer edge of section 43. Optical surface 51 is positioned relative to the axis of rotation as described above for mirror 11, such that the axis of the drive shaft (not shown) bisects optical surface 51 and is tangent to surface 51.

In FIG. 6, scan mirror 53 also has an oval-shaped optical section 55, though in this embodiment the minor axis is oriented to be parallel to the axis of rotation. Support section 57 has mounting bracket 59, also like bracket 35, for mounting mirror 53 to the shaft (not shown) of the drive system. Optical surface 61 is located tangent to and bisected by the axis of rotation.

In one embodiment, the present invention addresses the requirements of sub-micro-radian pointing at greater than 5 kHz bandwidth. One application includes a 12-inch diameter, closed back SiC mirror that is useful for airborne laser and free space optical communication. Mirror structure and weight are significant factors for accommodating actuation interface and minimum power requirements.

Several advantages are realized with the present invention. The scan mirrors are assembled from interchangeable optical and support sections formed from a precursor material, then the precursor is converted into a ceramic material. By having separate sections that are assembled prior to conversion, engineers can focus on the specific requirements of each section, improving the performance of both sections. The interchangeability allows for a method of forming mirrors, in which one or both of the sections are selected from an existing inventory of sections based on the end-user application. Alternatively, one or both components can be easily machined from a precursor on an as-needed basis, assembled with a corresponding section, and then converted into a ceramic material.

While the invention has been shown or described in only some of its forms, it should be apparent to those skilled in the art that it is not so limited, but is susceptible to various changes without departing from the scope of the invention.

What is claimed is:

1. A method of forming a monolithic structure of a ceramic material, the method comprising:
   (a) forming a first graphite component, the first component having at least one surface and at least one attachment surface;
   (b) forming a second graphite component, the second component having at least one attachment surface;
   (c) assembling the first component with the second component in a selected orientation, the attachment surface of the first component being adjacent and in direct contact with the attachment surface of the second component; and
   (d) conversion bonding the first component and the second component, wherein the conversion bonding converts the graphite in both the first component and the second component into silicon carbide by substituting a plurality of silicon atoms for a portion of carbon atoms in the graphite, and the first component and the second component are bonded into a unitary object formed as a monolithic structure.

2. A method according to claim 1, wherein step (d) comprises converting the first and second components from graphite crystal structure to a larger crystal silicon carbide structure, such that grains grow across an interface between the first and second components.

3. A method according to claim 1, wherein step (c) comprises defining a seam between the first and second components, and step (d) comprises eliminating the seam.

4. A method according to claim 1, wherein step (d) comprises changing the attachment surfaces into a continuous phase of converted silicon carbide that combines the previously separate first and second components.

5. A method according to claim 1, wherein step (c) comprises forming an interference fit between the first and second components having a range of separation of 0.001 to 0.005 inches.

6. A method according to claim 1, wherein step (d) comprises reducing a thermal mass of the unitary object as it is converted.

7. A method according to claim 1, wherein step (d) comprises substituting silicon atoms for approximately half of the carbon atoms in the graphite.

8. A method of forming a monolithic structure, the method comprising
   (a) providing a plurality of graphite components having selected shapes and sizes, each component having an attachment surface;
   (b) providing a plurality of graphite support sections having selected shapes and sizes, each support section having an attachment surface;
   (c) selecting one of the components and one of the support sections according to an end-user application;
   (d) assembling the component and support section in a selected orientation to form an assembly, the attachment surfaces of the component and support section being in direct contact with each other in an interference fit and defining a seam therebetween; and then
   (e) conversion bonding the component and support section, wherein the conversion bonding converts the graphite of the component and support section into a different material by substituting a portion of carbon atoms in the graphite with a plurality of different atoms, and the component and support section are bonded into a unitary object comprising a monolithic structure and the seam is eliminated.

9. A method according to claim 8, wherein the different material is silicon carbide, and step (e) comprises substituting silicon atoms for approximately half of the carbon atoms in the graphite.

10. A method according to claim 8, wherein step (e) comprises converting the component and support section from graphite crystal structure to a larger crystal silicon carbide structure, such that grains grow across the seam between the component and the support section.

11. A method according to claim 8, wherein step (e) comprises changing the attachment surfaces into a continuous phase of converted silicon carbide that combines the previously separate component and support section into the monolithic structure.

12. A method according to claim 8, wherein step (d) comprises forming the interference fit between the component and support section in a range of separation of 0.001 to 0.005 inches.

13. A method according to claim 8, wherein step (e) comprises reducing a thermal mass of the unitary object as it is converted.

14. A method of forming a monolithic structure, the method comprising:
   (a) providing first and second graphite components, each having an attachment surface;
   (b) assembling the first and second components to form an assembly, the attachment surfaces of the first and second components being in contact with each other in an interference fit and defining a seam therebetween; and then
   (c) conversion bonding the first and second components, wherein the conversion bonding converts the graphite of the first and second components into silicon carbide by substituting a plurality of silicon atoms for a portion of carbon atoms in the graphite, and grains grow across the seam to bond the first and second components into a unitary object comprising a monolithic structure and the seam is eliminated.

15. A method according to claim 14, wherein step (c) comprises substituting silicon atoms for approximately half of the carbon atoms in the graphite such that the first and second components combine from graphite crystal structure to a larger crystal silicon carbide structure.

16. A method according to claim 14, wherein step (c) comprises changing the attachment surfaces into a continuous phase of converted silicon carbide that combines the previously separate first and second components into the monolithic structure.

17. A method according to claim 14, wherein step (b) comprises forming the interference fit between the first and second components in a range of separation of 0.001 to 0.005 inches.

18. A method according to claim 14, wherein step (c) comprises reducing a thermal mass of the unitary object as it is converted from graphite to silicon carbide.

* * * * *

UNITED STATES PATENT AND TRADEMARK OFFICE
CERTIFICATE OF CORRECTION

| | | |
|---|---|---|
| PATENT NO. | : 7,931,853 B2 | Page 1 of 1 |
| APPLICATION NO. | : 11/937626 | |
| DATED | : April 26, 2011 | |
| INVENTOR(S) | : Ronald E. Plummer | |

It is certified that error appears in the above-identified patent and that said Letters Patent is hereby corrected as shown below:

- Col. 1, line 6. "This divisional pataent application" should be 'This divisional patent application'.

Signed and Sealed this
Twentieth Day of September, 2011

David J. Kappos
*Director of the United States Patent and Trademark Office*